(12) United States Patent
Yin

(10) Patent No.: US 11,645,849 B2
(45) Date of Patent: May 9, 2023

(54) CIRCULAR SIGN CANDIDATE EXTRACTION DEVICE AND NON-TRANSITORY COMPUTER-READABLE STORAGE MEDIUM FOR STORING PROGRAM

(71) Applicant: FUJITSU LIMITED, Kawasaki (JP)

(72) Inventor: Fang Yin, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 17/331,686

(22) Filed: May 27, 2021

(65) Prior Publication Data

US 2022/0044036 A1   Feb. 10, 2022

(30) Foreign Application Priority Data

Aug. 7, 2020  (JP) .............................. JP2020-135229

(51) Int. Cl.
*G06V 20/58* (2022.01)
*G06V 10/44* (2022.01)
*G06V 10/56* (2022.01)

(52) U.S. Cl.
CPC ............ *G06V 20/582* (2022.01); *G06V 10/44* (2022.01); *G06V 10/56* (2022.01)

(58) Field of Classification Search
CPC ...... G06V 20/582; G06V 10/44; G06V 10/56; G06V 10/48

USPC .......................................................... 382/103
See application file for complete search history.

(56) References Cited

U.S. PATENT DOCUMENTS

| | | | |
|---|---|---|---|
| 2008/0002891 A1* | 1/2008 | Shibata ............ | G08G 1/096716 382/209 |
| 2013/0058534 A1* | 3/2013 | Zobel .................. | G06V 10/421 382/103 |
| 2015/0100224 A1* | 4/2015 | Tsuda ............... | G08G 1/096783 701/117 |
| 2016/0311362 A1* | 10/2016 | Fendt .................... | B60Q 1/085 |
| 2016/0321510 A1* | 11/2016 | Abhau ................ | G06V 20/582 |

FOREIGN PATENT DOCUMENTS

| | | |
|---|---|---|
| JP | 2013-254242 A | 12/2013 |
| JP | 2018-120629 A | 8/2018 |

\* cited by examiner

*Primary Examiner* — Ali Bayat
(74) *Attorney, Agent, or Firm* — Fujitsu Patent Center

(57) ABSTRACT

A circular sign candidate extraction device includes: a memory; and a processor coupled to the memory, the processor being configured to perform processing, the processing including: detecting a circle from a captured image; specifying an annular region surrounded by the detected circle and a concentric circle, the concentric circle being a circle having a radius different from the detected circle; setting one or more pixels among pixels included in the annular region as determination pixels; and extracting a circular sign candidate from the detected circle in accordance with comparison between a color of the determination pixel and a predetermined color.

18 Claims, 10 Drawing Sheets

CIRCULAR SIGN CANDIDATE EXTRACTION DEVICE AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2020-135229, filed on Aug. 7, 2020, the entire contents of which are incorporated herein by reference.

FIELD

The disclosed technology is related to a circular sign candidate extraction device and a non-transitory computer-readable storage medium for storing a circular sign candidate extraction program.

BACKGROUND

In recent years, there has been an increasing demand for safe driving assistance technology for automobiles, and for example, a road sign is recognized from an image captured by an in-vehicle camera or the like. To recognize a circular road sign (hereinafter, referred to as "circular sign"), first, a circular portion is detected from an input image, and pattern matching or the like is performed on the detected circular portion so as to recognize the circular sign.

As a method for detecting a circular shape from an image, a method using the Hough transform is known. In the Hough transform, a circle is expressed by $r2=(x-a)^2+(y-b)^2$ using a parameter r indicating a radius and a parameter (a, b) indicating a coordinate of the center of the circle. Then, an edge is detected from the input image, and all pixels are scanned using (a, b) and r as parameters. If the pixel is positioned on the edge, a score is given to a point in the Hough space in which each of a, b, and r is set as an axis, and vote is performed to generate one curved surface. The points in the Hough space that has acquired the largest number of votes are recognized as pixels on a circumference of the circle having the center (a, b) and the radius r. However, in a case where a circular shape is detected using the Hough transform, for example, in an image in which edges such as trees or buildings are concentrated, wrong detection of a circular shape easily occurs. As a result, this may cause an increase in a load of circular sign recognition processing, wrong recognition, or the like.

Therefore, a vehicle exterior environment recognition device has been proposed that suppresses the number of feature points within a predetermined range by changing feature point extraction conditions according to edges and color components as needed. This device moves a detected pixel in four directions in the horizontal direction and the vertical direction from the center position of each candidate of the circular sign while determining whether or not a V component of each pixel is equal to or more than a threshold Vthr. Then, in this device, when a predetermined number of pixels (for example, three pixels) of which the V component is equal to or more than the threshold Vthr are continuously provided, a pixel at which the detection of the V component equal to or more than the threshold Vthr is started is set as an inner edge of a red frame.

Furthermore, an image recognition device has been proposed that corrects the central coordinate to a more correct central coordinate in a case where a central coordinate of a circular shape or an elliptical shape is roughly recognized. This device acquires a center position of which a midpoint of each of two orthogonal chords passing through the center position of the circle or the ellipse detected on the basis of the acquired image is corrected to a position in a direction of each chord.

Examples of the related art include Japanese Laid-open Patent Publication No. 2018-120629 and Japanese Laid-open Patent Publication No. 2013-254242.

However, there is a problem in that the vehicle exterior environment recognition device according to the related art described above cannot be applied to a circular sign in which an inner edge does not exist. Furthermore, there is a problem in that because the vehicle exterior environment recognition device according to the related art compares color components of pixels in all four directions from the center of the circle to the circumference with a threshold, a calculation amount increases. Furthermore, the image recognition device according to the related art described above accurately corrects the center on the basis of the center of the circular sign that is roughly recognized, this is the technique on the premise that the circular sign has been already extracted.

As an aspect of the embodiments disclosed below, there is provided a solution to reduce a calculation amount when a circular sign candidate is extracted from an image.

SUMMARY

According to an aspect of the embodiments, a circular sign candidate extraction device includes: a memory; and a processor coupled to the memory, the processor being configured to perform processing, the processing including: detecting a circle from a captured image; specifying an annular region surrounded by the detected circle and a concentric circle, the concentric circle being a circle having a radius different from the detected circle; setting one or more pixels among pixels included in the annular region as determination pixels; and extracting a circular sign candidate from the detected circle in accordance with comparison between a color of the determination pixel and a predetermined color.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, an example of an embodiment according to the disclosed technology will be described with reference to the drawings.

Figure 1:
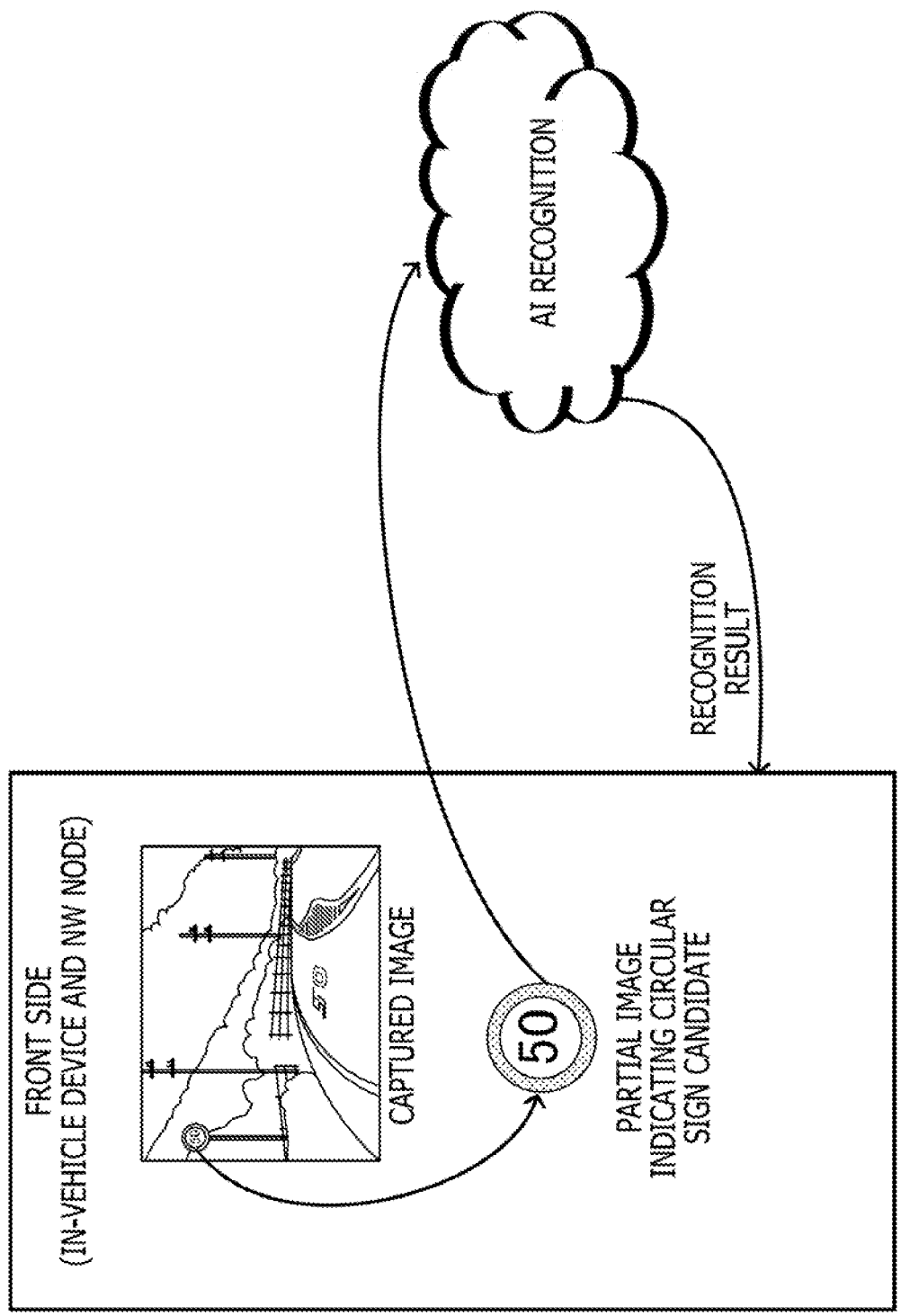
FIG. 1 is a diagram for explaining an outline of a service provided by a circular sign recognition system.

First, an outline of a service provided by a circular sign recognition system according to the present embodiment will be described with reference to FIG. 1. The circular sign recognition system according to the present embodiment is a cloud-front cooperation type system. A device on the front side is an in-vehicle device, a network (NW) node or the like that is positioned in the middle of mobile base stations or the like. In the cloud-front cooperation type system, a data transfer amount between the cloud and the front can be a bottleneck. Therefore, the circular sign recognition system according to the present embodiment extracts a partial image indicating a circular sign candidate from a captured image on the front side and transmits the extracted partial image, not the entire captured image, to the cloud side. In other words, for example, by performing preprocessing for extracting a region required for recognition of the circular sign on the front side and transmitting the extracted region to the cloud side, the data transfer amount between the cloud and the front is largely reduced. The cloud side, recognizes the partial image received from the front side, for example, by Artificial Intelligence (AI), recognizes a type of the circular sign indicated by the partial image, content indicated by the circular sign, or the like, and returns the recognition result to the front side.

Figure 2:
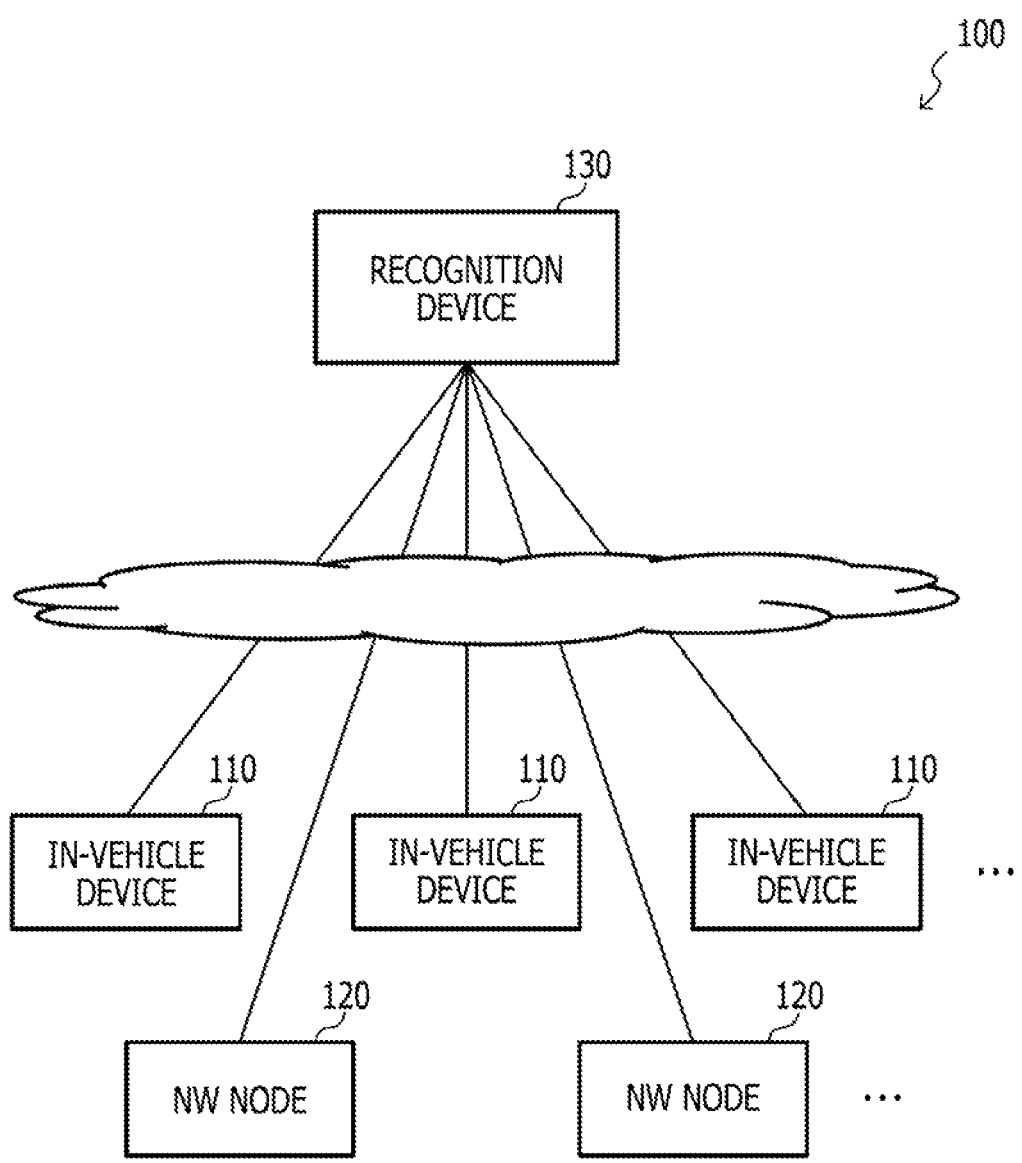
FIG. 2 is a block diagram illustrating a schematic configuration of the circular sign recognition system.

As illustrated in FIG. 2, a circular sign recognition system 100 according to the present embodiment includes a plurality of in-vehicle devices 110, a plurality of NW nodes 120, and a recognition device 130. The in-vehicle devices 110 and the NW nodes 120 are examples of a front-side device in the cloud-front cooperation type system, and the recognition device 130 is an example of a cloud-side device.

Figure 3:
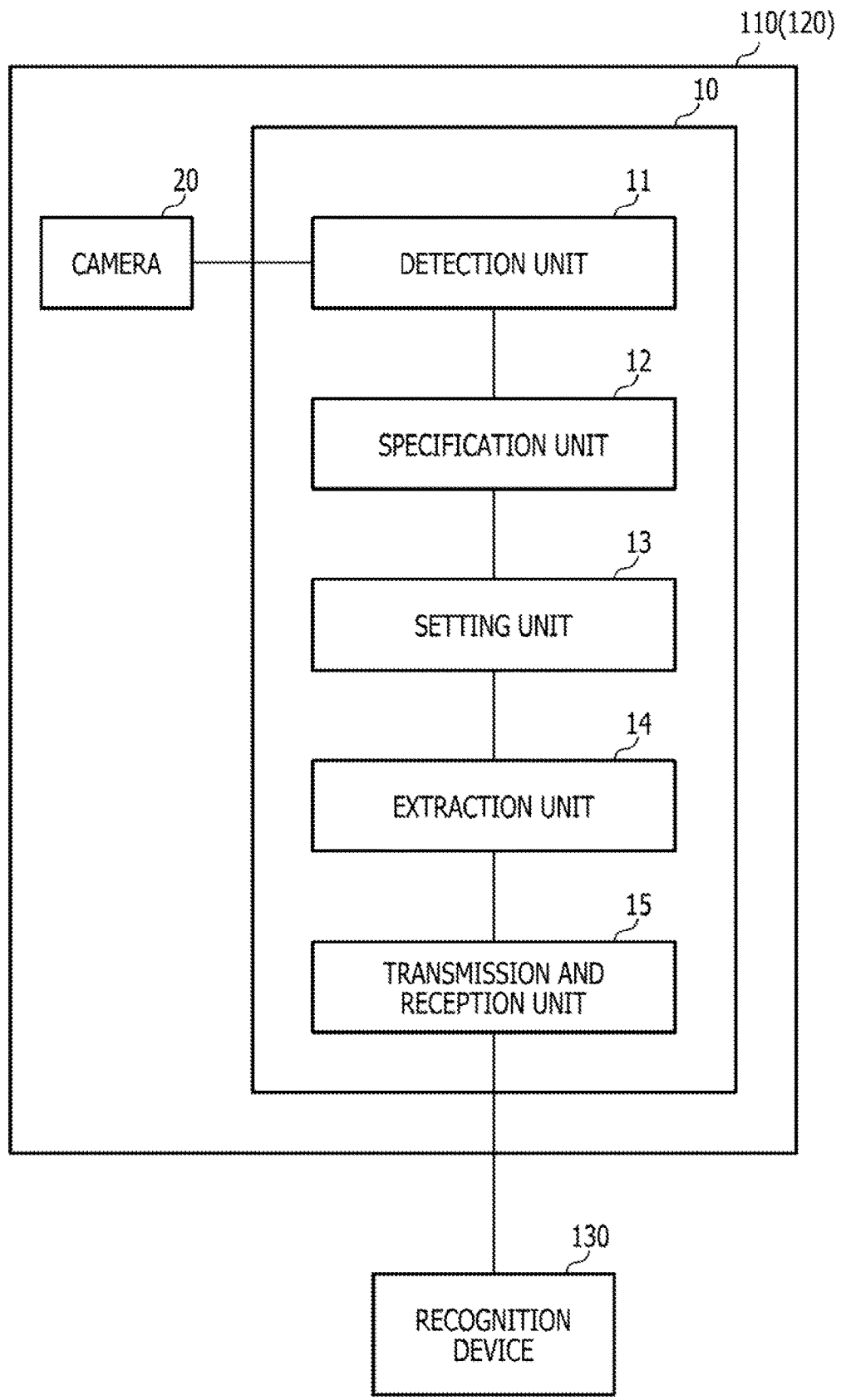
FIG. 3 is a functional block diagram of a circular sign candidate extraction device.

As illustrated in FIG. 3, the in-vehicle device 110 includes a circular sign candidate extraction device 10 and a camera 20. As illustrated in FIG. 3, the circular sign candidate extraction device 10 functionally includes a detection unit 11, a specification unit 12, a setting unit 13, an extraction unit 14, and a transmission and reception unit 15.

The detection unit 11 acquires a captured image captured by the camera 20 and detects an edge indicating a circle from the captured image, for example, through Hough transform or the like. Hereinafter, the edge indicating the circle detected by the detection unit 11 is referred to as a "detected circle" The detection unit 11 obtains a central coordinate and a radius of the detected circle and transfers the central coordinate and the radius to the specification unit 12. Note that the method for detecting a circular shape is not limited to a case where the Hough transform is used. It is sufficient that any method that can acquire the central coordinate and the radius of the circle be used.

Figure 4:
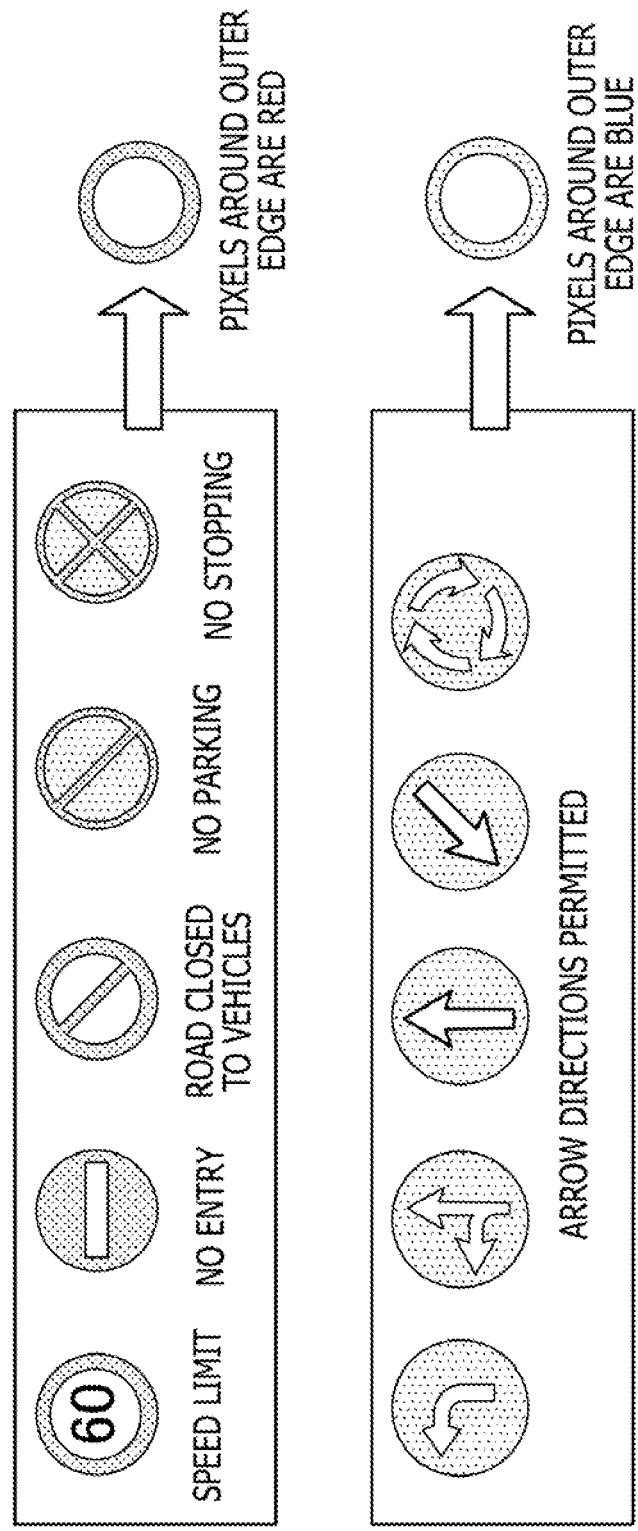
FIG. 4 is a diagram for explaining features of a circular sign.

Here, as illustrated in FIG. 4, a predetermined color is used around an outer edge of the circular sign. In the example in FIG. 4, a color around an outer edge of a circular sign classified into an upper row is red, and a color of an outer edge around a circular sign classified into a lower row is blue. Furthermore, regarding the circular sign classified into the upper row, there is a case where a circular shape is provided on an inner side of the outer edge, and there is a case where the detection unit 11 detects the inner circular shape as a detected circle.

As described above, in a case where a circular shape is detected using the Hough transform, wrong detection of a circular shape easily occurs, for example, in an image in which edges such as trees or buildings are concentrated. Therefore, in consideration of the feature of the circular sign described above, the circular sign candidate extraction device 10 extracts a circular sign candidate from the detected circles by the specification unit 12, the setting unit 13, and the extraction unit 14. As a result, because transfer of the detected circle, which has been wrongly detected, to the recognition device 130 is prevented, the data transfer amount between the front and the cloud can be reduced. Hereinafter, each of the specification unit 12, the setting unit 13, and the extraction unit 14 will be described in detail.

The specification unit 12 specifies an annular region surrounded by the detected circle detected by the detection unit 11 and a circle to be a concentric circle, which has a radius different from that of the detected circle and which is concentrically provided with respect to the detected circle (hereinafter, simply referred to as "concentric circle"). Specifically, for example, the specification unit 12 specifies an inner-side annular region surrounded by the detected circle and a concentric circle having a radius smaller than that of the detected circle and an outer-side annular region surrounded by the detected circle and a concentric circle having a radius larger than that of the detected circle.

Figure 5:
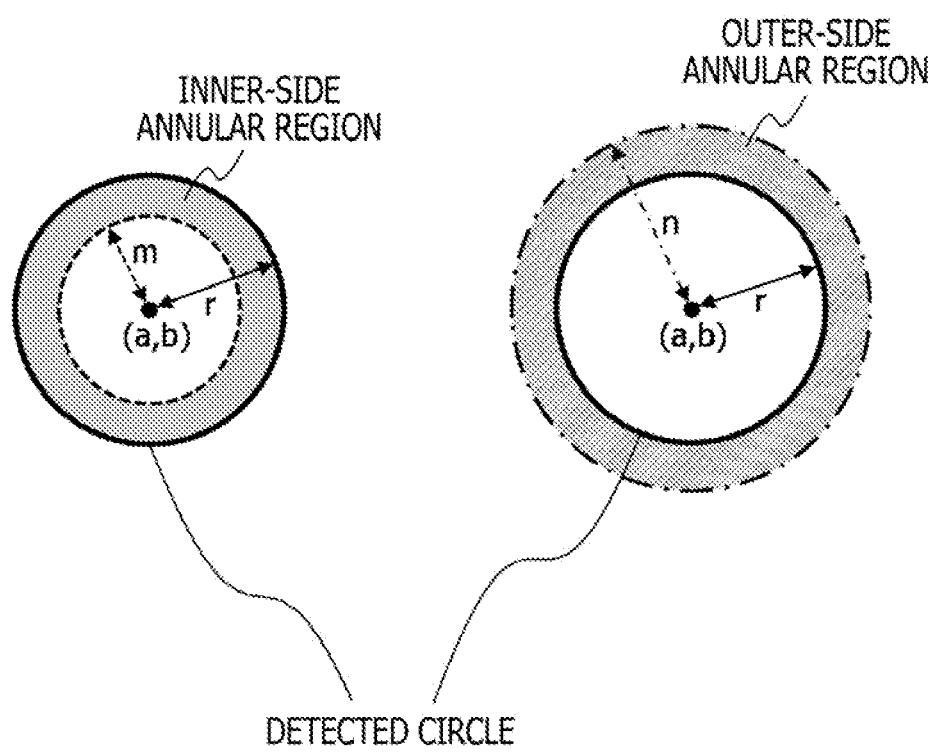
FIG. 5 is a diagram for explaining specification of an annular region.

For example, as illustrated in FIG. 5, it is assumed that a central coordinate of a detected circle (circle indicated by solid line in FIG. 5) be (a, b) and a radius be r. The specification unit 12 calculates a radius m of the concentric circle as $m = r \times \alpha$ using $\alpha$ (for example, $\alpha = 3/4$) that satisfies $0 < \alpha < 1$. Then, a region (hatched region in FIG. 5) surrounded by the detected circle and a concentric circle (circle indicated by broken line in FIG. 5) with the center (a, b) and the radius m is specified as the inner-side annular region. Similarly, the specification unit 12 calculates a radius n of the concentric circle as $n = r \times \beta$ using $\beta$ (for example, $\beta = 5/4$) that satisfies $\beta > 1$. Then, a region (shaded region in FIG. 5) surrounded by the detected circle and a concentric circle (circle indicated by alternate long and short dash line in FIG. 5) with the center (a, b) and the radius n is specified as the outer-side annular region.

Note that the inner-side annular region is an example of a "first annular region" in the disclosed technology, and the outer-side annular region is an example of a "second annular region" in the disclosed technology. Furthermore, hereinafter, in a case where the inner-side annular region and the outer-side annular region are described without distinguishing the regions from each other, the inner-side annular region and the outer-side annular region are simply referred to as an "annular region".

The setting unit 13 sets one or more pixels among pixels included in the annular region as determination pixels used to determine whether or not the detected circle is a circular sign candidate. Furthermore, in a case where the plurality of determination pixels is set, the setting unit 13 sets the plurality of pixels so that a scattering degree of positions of the determination pixels in the annular region is equal to or more than a predetermined value. By increasing the scattering degree of the positions of the determination pixels determination accuracy can be improved as compared with a case where the plurality of determination pixels is set at positions that are unevenly provided.

Figure 6:
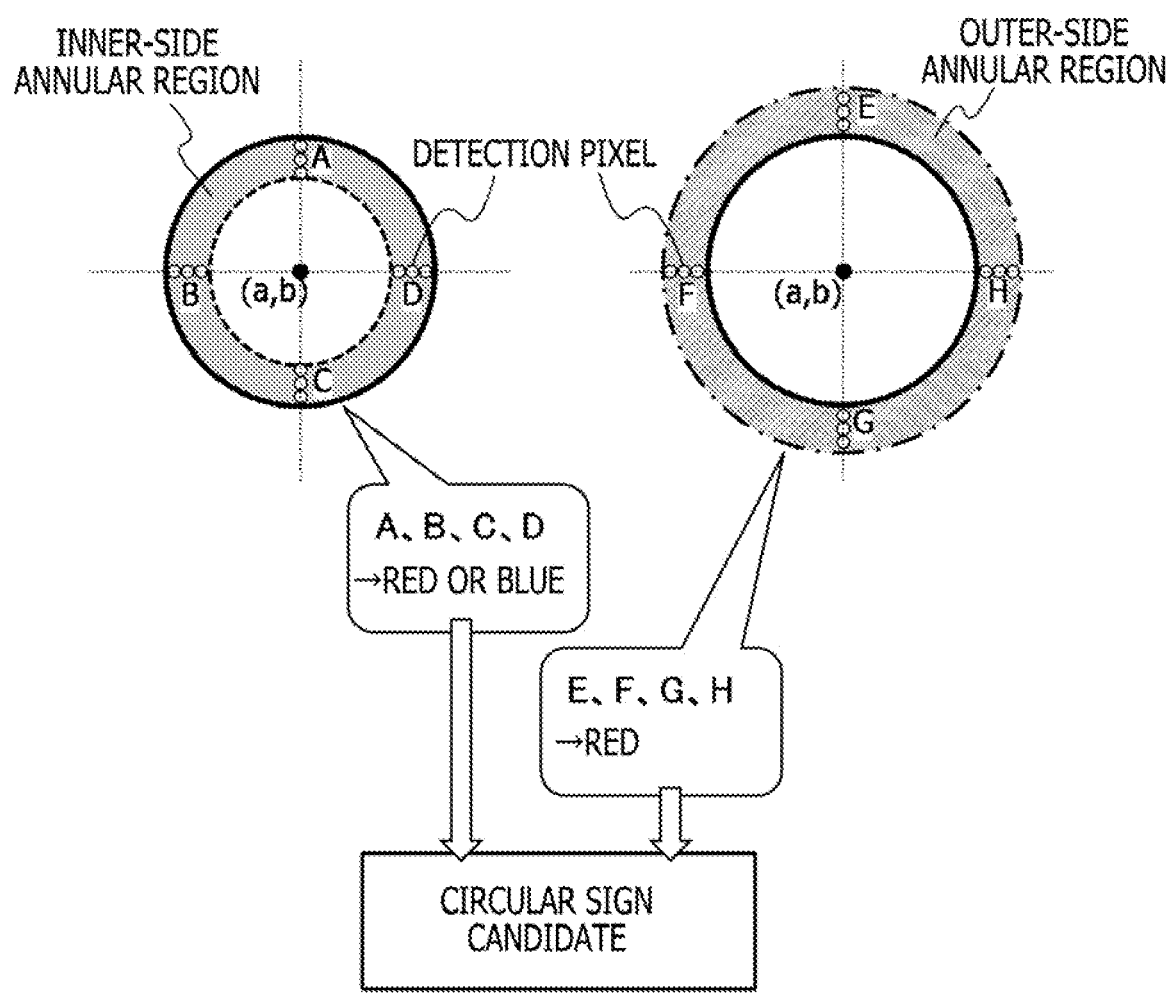
FIG. 6 is a diagram for explaining setting of determination pixels.

For example, as illustrated in FIG. 6, the setting unit 13 can set each of pixels on lines in four directions orthogonal to each other at the center of the detected circle in the annular region as the determination pixel. As a result, the scattering degree of the positions of the determination pixels can be increased with a simple method. In FIG. 6, an example is illustrated in which the setting unit 13 sets a determination pixel group at each of positions A, B, C, and D in the inner-side annular region and sets a determination pixel group at each of positions E, F, G, and H in the outer-side annular region.

Note that, in a case where the plurality of determination pixels is set, the setting unit 13 does not need to set pixels positioned at the same distance from the center of the detected circle as the determination pixels, and can set pixels at positions each having different distances from the center of the detected circle as the determination pixels within the annular region.

The extraction unit 14 extracts a circular sign candidate from the detected circles on the basis of comparison between a color of the determination pixel set by the setting unit 13 and a predetermined color. For example, the predetermined color may be red or blue on the basis of the features of the circular sign described with reference to FIG. 4.

More specifically, for example, in the example in FIG. 6, in a case where the determination pixels of which the number is equal to or more than a predetermined ratio (for example, equal to or more than 80%) included in the determination pixel group set at each of positions A, B, C, and D in the inner-side annular region are red or blue, the extraction unit 14 extracts a detected circle that defines the inner-side annular region as a circular sign candidate. Furthermore, in a case where the determination pixels of which the number is equal to or more than the predetermined ratio included in the determination pixel group set at each of positions E, F, G, and H in the outer-side annular region are red, the extraction unit 14 extracts a detected circle that defines the outer-side annular region as a circular sign candidate. Note that red or blue used for comparison with the color of the determination pixels in the inner-side annular region is an example of a "first color" in the disclosed technology, red used for comparison with the color of the determination pixels in the outer-side annular region is an example of a "second color" in the disclosed technology.

Note that, in a case where the determination pixel set to the outer-side annular region is used, a case is assumed where a circular shape in the circular sign is detected as the detected circle. In other words, for example, because the circular sign classified into the upper row in FIG. 6 is assumed, it is sufficient to determine whether or not the determination pixel set to the outer-side annular region be red.

Furthermore, the predetermined ratio described above may be set to 100%, and it may be determined whether all the pixels in the determination pixel group are red or blue. However, the detected circle detected from the captured image is not limited to be a perfect circle as in a case where an object faces the capturing direction of the camera 20 or the like. Furthermore, there is a case where a part of the circle is hidden by an obstacle such as a tree. In consideration of these, as described above, the predetermined ratio may be set to a value smaller than 100%.

The transmission and reception unit 15 transmits a partial image indicating the circular sign candidate extracted by the extraction unit 14 to the recognition device 130 and receives the recognition result from the recognition device 130.

Because the configuration of the NW node 120 is a configuration including the camera 20 and the circular sign candidate extraction device 10 similarly to the in-vehicle device 110 described above, detailed description is omitted.

When receiving the partial image from the circular sign candidate extraction device 10, the recognition device 130 recognizes a type of the circular sign indicated by the received partial image, content indicated by the circular sign, or the like and transmits the recognition result to the circular sign candidate extraction device 10. Furthermore, when the recognition device 130 recognizes the circular sign candidate indicated by the partial image is not the circular sign, the recognition device 130 transmits the recognition result indicating that the circular sign candidate is not the circular sign to the circular sign candidate extraction device 10. Note that the recognition device 130 is an example of an "external device" in the disclosed technology.

Figure 7:
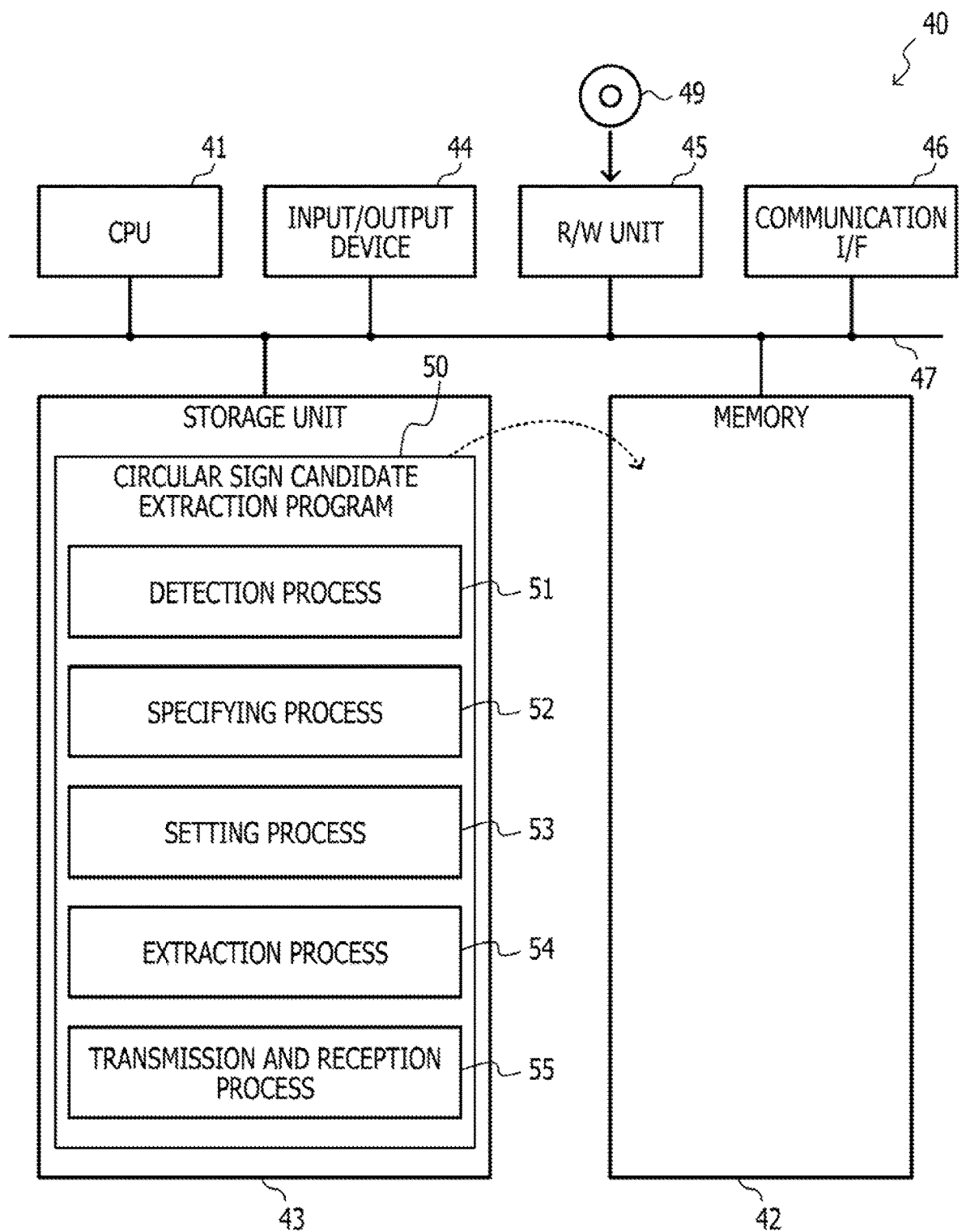
FIG. 7 is a block diagram illustrating a schematic configuration of a computer that functions as a circular sign candidate extraction device.

The circular sign candidate extraction device 10 can be implemented, for example, by a computer 40 illustrated in FIG. 7. The computer 40 includes a central processing unit (CPU) 41, a memory 42 as a temporary storage region, and a nonvolatile storage unit 43. Furthermore, the computer 40 also includes an input/output device 44 such as an input unit or a display unit, a read/write (R/W) unit 45 that controls reading and writing of data to and from a storage medium 49. Furthermore, the computer 40 includes a communication interface (I/F) 46 connected to a network such as the Internet. The CPU 41, the memory 42, the storage unit 43, the input/output device 44, the R/W unit 45, and the communication I/F 46 are connected to each other via a bus 47.

The storage unit 43 can be implemented by a hard disk drive (HDD), a solid state drive (SSD), a flash memory, or the like. The storage unit 43 as a storage medium stores a circular sign candidate extraction program 50 that makes the computer 40 function as the circular sign candidate extraction device 10. The circular sign candidate extraction program 50 includes a detection process 51, a specifying process 52, a setting process 53, an extraction process 54, and a transmission and reception process 55.

The CPU 41 reads the circular sign candidate extraction program 50 from the storage unit 43, develops the program in the memory 42, and sequentially executes the processes included in the circular sign candidate extraction program 50. The CPU 41 executes the detection process 51 so as to operate as the detection unit 11 illustrated in FIG. 3. Furthermore, the CPU 41 executes the specifying process 52 so as to operate as the specification unit 12 illustrated in FIG. 3. Furthermore, the CPU 41 executes the setting process 53 so as to operate as the setting unit 13 illustrated in FIG. 3. Furthermore, the CPU 41 executes the extraction process 54 so as to operate as the extraction unit 14 illustrated in FIG. 3. Furthermore, the CPU 41 executes the transmission and reception process 55 so as to operate as the transmission and reception unit 15 illustrated in FIG. 3. As a result, the computer 40 that executes the circular sign candidate extraction program 50 functions as the circular sign candidate extraction device 10. Note that the CPU 41 that executes programs is hardware.

Note that the function that is implemented by the circular sign candidate extraction program 50 can be implemented by, for example, a semiconductor integrated circuit, more detail, an application specific integrated circuit (ASIC) or the like.

Figure 8:
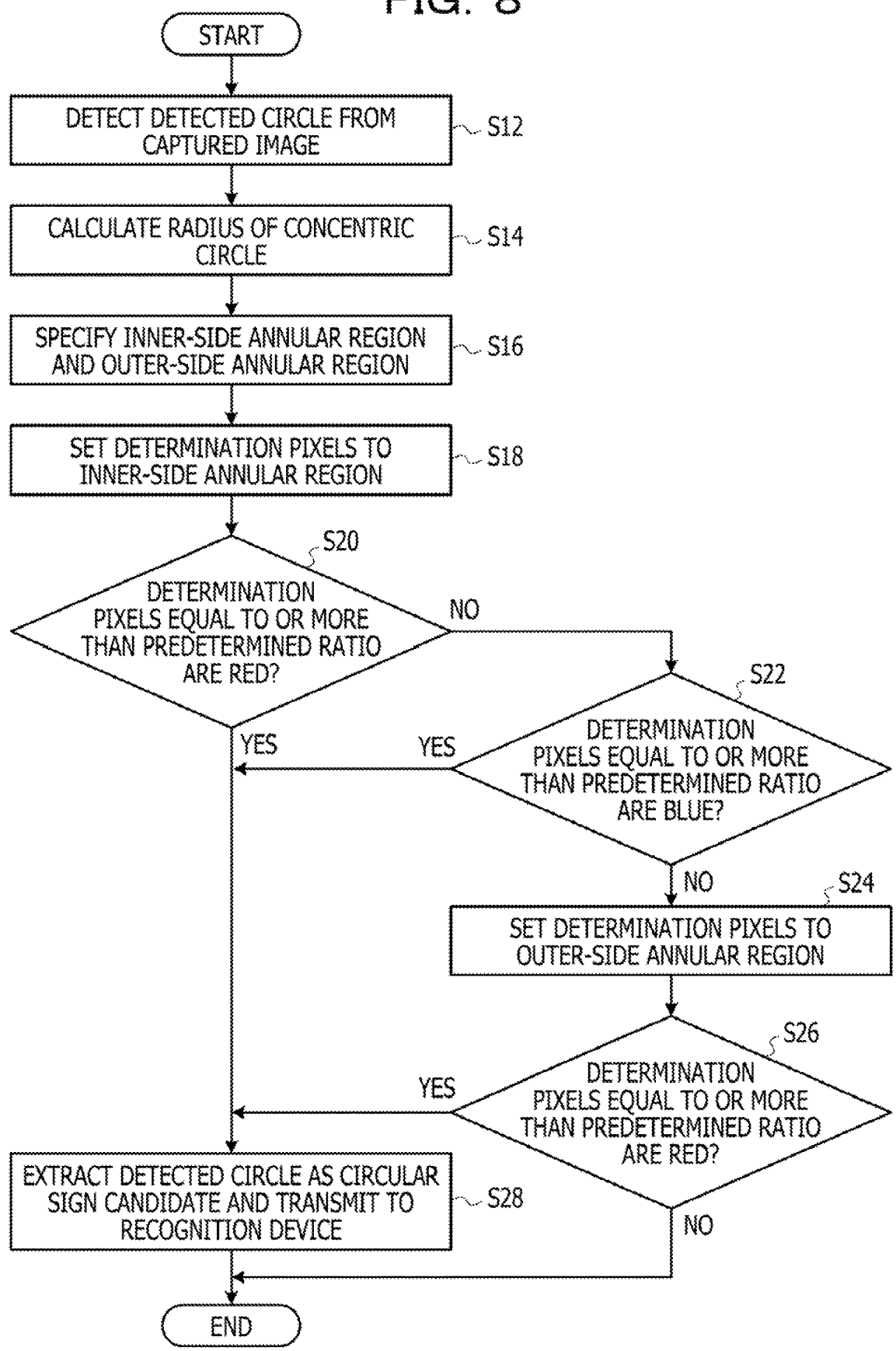
FIG. 8 is a flowchart illustrating an example of circular sign candidate extraction processing.

Next, an action of the circular sign recognition system 100 according to the present embodiment will be described. In each of the in-vehicle device 110 and the NW node 120, when the captured image captured by the camera 20 is input to the circular sign candidate extraction device 10, circular sign candidate extraction processing illustrated in FIG. 8 is executed by the circular sign candidate extraction device 10.

In step S12, the detection unit 11 acquires the captured image captured by the camera 20 and detects an edge (detected circle) indicating a circle from the captured image, for example, through Hough transform or the like. The detection unit 11 obtains a central coordinate (a, b) and a radius r of the detected circle that has been detected.

Next, in step S14, the specification unit 12 calculates a radius m of the concentric circle as m=r×α using α (for example, α=3/4) that satisfies 0<α<1. Furthermore, the specification unit 12 calculates a radius n of the concentric circle as n=r×β using β (for example, β=5/4) that satisfies β>1.

Next, in step S16, the specification unit 12 specifies a region surrounded by the detected circle and the concentric circle with the center (a, b) and the radius m as an inner-side annular region. Furthermore, the specification unit 12 specifies a region surrounded by the detected circle and the concentric circle with the center (a, b) and the radius n as an outer-side annular region.

Next, in step S18, the setting unit 13 sets the determination pixels in the inner-side annular region. For example, the setting unit 13 sets a pixel at each of positions (a, b−r), (a, b=r+1), . . . , and (a, b−m) as a determination pixel group for the position A illustrated in FIG. 6. Furthermore, the setting unit 13 sets a pixel at each of positions (a−r, b), (a−r+1, b), . . . , and (a−m, b) as a determination pixel group for the position B illustrated in FIG. 6. Furthermore, the setting unit 13 sets a pixel at each of positions (a, b+r), (a, b+r−1), . . . , and (a, b+m) as a determination pixel group for the position C illustrated in FIG. 6. Furthermore, the setting unit 13 sets a pixel at each of positions (a+r, b), (a+r−1, b), . . . , and (a+m, b) as a determination pixel group for the position D illustrated in FIG. 6.

Next, in step S20, the extraction unit 14 determines whether or not the determination pixels of which the number is equal to or more than a predetermined ratio (for example, equal to or more than 80%) included in the determination pixel group set in the inner-side annular region in step S18 described above are red. In a case where the determination pixels of which the number is equal to or more than the predetermined ratio are red, the processing proceeds to step S28, and in a case where the number of red determination pixels is less than the predetermined ratio, the processing proceeds to step S22.

In step S22, the extraction unit 14 determines whether or not the color of the determination pixels of which the number is equal to or more than the predetermined ratio (for example, equal to or more than 80%) included in the determination pixel group set in the inner-side annular region in step S18 described above is blue. In a case where the color of the determination pixels of which the number is equal to or more than the predetermined ratio is blue, the processing proceeds to step S28, and in a case where the number of blue determination pixels is less than the predetermined ratio, the processing proceeds to step S24.

In step S24, the setting unit 13 sets the determination pixels in the outer-side annular region. For example, the setting unit 13 sets a pixel at each of positions (a, b−r), (a, b−r−1), . . . , and (a, b−n) as a determination pixel group for the position E illustrated in FIG. 6. Furthermore, the setting unit 13 sets a pixel at each of positions (a−r, b), (a−r−1, b), . . . , and (a−n, b) as a determination pixel group for the position F illustrated in FIG. 6. Furthermore, the setting unit 13 sets a pixel at each of positions (a, b+r), (a, b+r+1), . . . , and (a, b+n) as a determination pixel group for the position G illustrated in FIG. 6. Furthermore, the setting unit 13 sets a pixel at each of positions (a+r, b), (a+r+1, b), . . . , and (a+n, b) as a determination pixel group for the position H illustrated in FIG. 6.

Next, in step S26, the extraction unit 14 determines whether or not the determination pixels of which the number is equal to or more than the predetermined ratio (for example, equal to or more than 80%) included in the determination pixel group set in the outer-side annular region in step S24 described above are red. In a case where the determination pixels of which the number is equal to or more than the predetermined ratio are red, the processing proceeds to step S28, and in a case where the number of red determination pixels is less than the predetermined ratio, the circular sign candidate extraction processing ends.

In step S28, the extraction unit 14 extracts the detected circle detected in step S12 described above as a circular sign candidate. Then, the transmission and reception unit 15 transmits the partial image indicating the circular sign candidate extracted by the extraction unit 14 to the recognition device 130, and the circular sign candidate extraction processing ends.

When receiving the partial image from the circular sign candidate extraction device 10, the recognition device 130 recognizes a type of the circular sign indicated by the received partial image, content indicated by the circular sign, or the like and transmits the recognition result to the circular sign candidate extraction device 10.

In the circular sign candidate extraction device 10, the transmission and reception unit 15 receives the recognition result and transfers the received recognition result to other components using the recognition result in the in-vehicle device 110 (or NW node 120). The other component is, for example, an automatic driving control device, an assist function that outputs an alert according to a sign, or the like.

As described above, according to the circular sign recognition system according to the present embodiment, the circular sign candidate extraction device specifies the annular region surrounded by the detected circle detected from the captured image and the concentric circle having the radius different from the detected circle. Then, the circular sign candidate extraction device sets one or more pixels among the pixels included in the annular region as the determination pixels and extracts the circular sign candidate from the detected circle on the basis of the comparison between the color of the determination pixel and the predetermined color. In this way, because the determination pixels set to the annular region are used, a calculation amount at the time when the circular sign candidate is extracted from the captured image can be reduced as compared with, for example, a case where color components of all the pixels in four directions from the center of the circle to the circumference with a threshold.

Note that, in the embodiment described above, a case has been described, in which, in the cloud-front cooperation type system, the front side extracts the circular sign candidate and the cloud side executes the circular sign candidate recognition processing. However, the embodiment is not limited to this.

For example, by making the in-vehicle device 110 or the NW node 120 have the function of the recognition device 130, a configuration can be formed in which the in-vehicle device 110 or the NW node 120 alone recognizes the circular sign.

Figure 9:
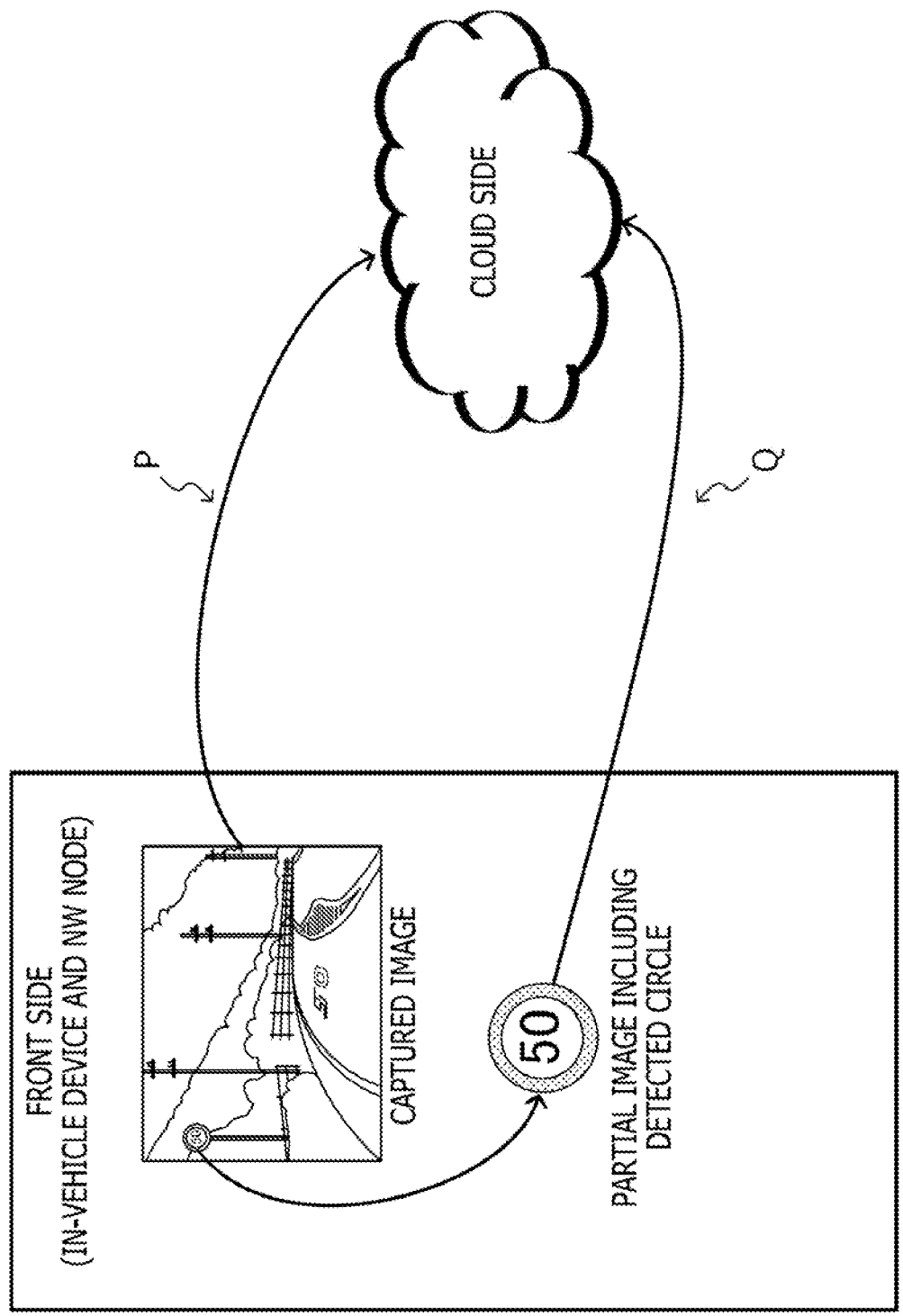
FIG. 9 is a diagram for explaining another example of the circular sign recognition system.

Furthermore, for example, by making the cloud side have the functions of the circular sign candidate extraction device 10 and the recognition device 130, the captured image captured by the camera 20 may be transmitted from the front side to the cloud side as illustrated by P of FIG. 9. In this case, although the data transfer amount between the front and the cloud is larger than that in a case of the embodiment described above, a processing load of the front side can be reduced.

Figure 10:
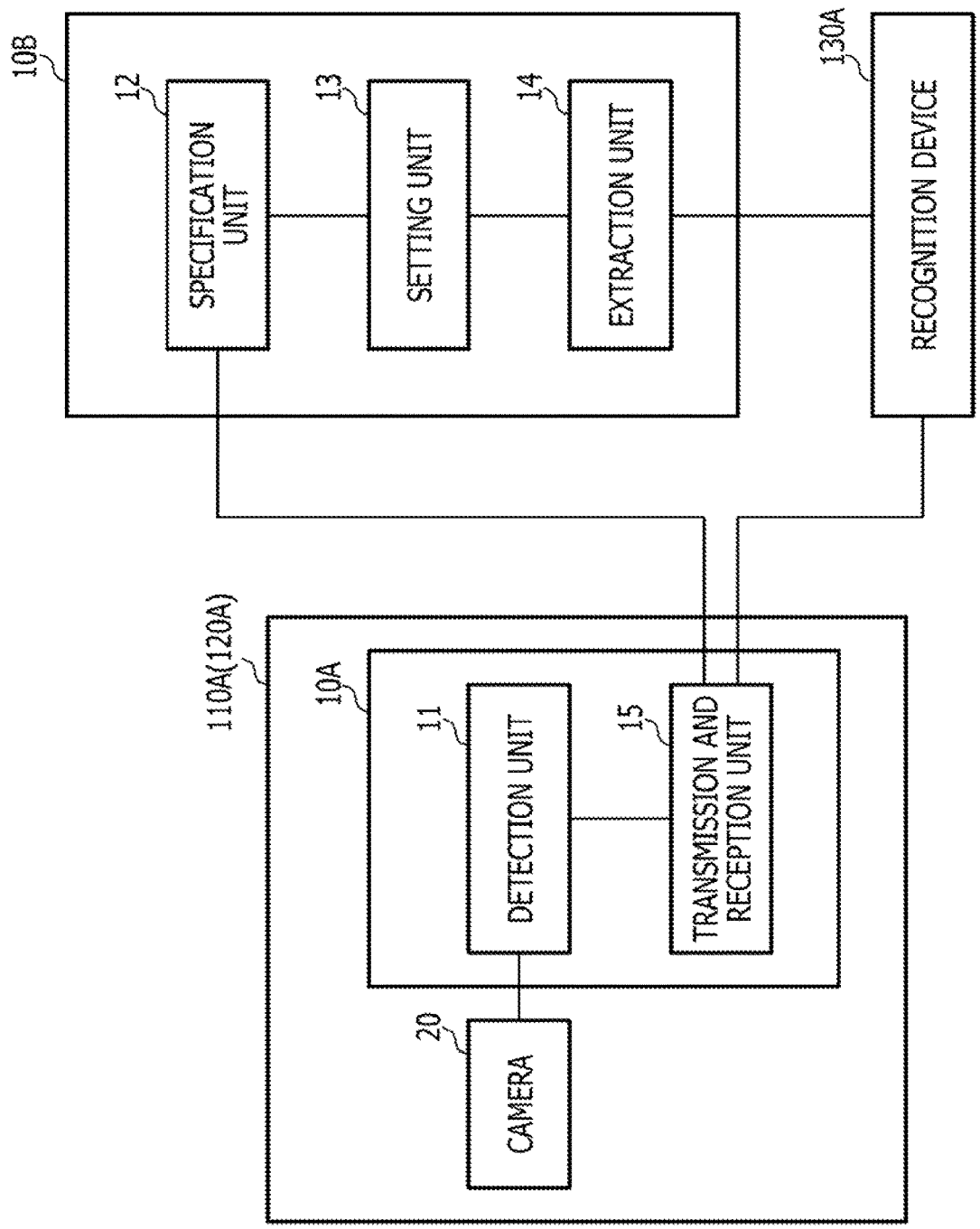
FIG. 10 is a block diagram illustrating still another example of the circular sign recognition system.

Furthermore, for example, as in a circular sign recognition system 100A illustrated in FIG. 10, functional units of a circular sign candidate extraction device may be distributed and arranged in an in-vehicle device 110A (or NW node 120A) on a front side and a cloud side. In the example in FIG. 10, the in-vehicle device 110A (or NW node 120A) includes a front side circular sign candidate extraction device 10A including a detection unit 11 and a transmission and reception unit 15. Furthermore, in the cloud side, a cloud side circular sign candidate extraction device 10B including a specification unit 12, a setting unit 13, and an extraction unit 14 is arranged. In this case, as illustrated by Q of FIG. 9, the front side transmits a partial image including a detected circle detected from a captured image to the cloud side. It is sufficient that the partial image including the detected circle be an image that includes a range to which an outer-side annular region can be set using the detected circle as a reference. As a result, although a data transfer amount between the front and the cloud is larger than that in a case of the embodiment described above, the data transfer amount is less than that in a case of P in FIG. 9. Furthermore, although a processing load of the front side is larger than that in a case of P in FIG. 9, the processing load can be reduced than that in the embodiment described above Furthermore, in the embodiment described above, according to the example in FIG. 4, a case has been described where the predetermined color to be compared with the color of the determination pixel is red or blue. However, the embodiment is not limited to this. The color may be any color such as a nationally designated color.

In addition, in the embodiment described above, a mode has been described in which the circular sign candidate extraction program is stored (installed) beforehand in the storage unit, provision of the program is not limited to this mode. The program according to the disclosed technology can also be provided in a form stored in a storage medium such as a compact disc read only memory (CD-ROM), a digital versatile disc read only memory (DVD-ROM), or a universal serial bus (USB) memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A circular sign candidate extraction device comprising:
    a memory; and
    a processor coupled to the memory, the processor being configured to perform processing, the processing including:
    detecting a circle from a captured image;
    specifying an annular region surrounded by the detected circle and a concentric circle, the concentric circle being a circle having a radius different from the detected circle;
    setting one or more pixels among pixels included in the annular region as determination pixels; and
    extracting a circular sign candidate from the detected circle in accordance with comparison between a color of the determination pixel and a predetermined color.

2. The circular sign candidate extraction device according to claim 1, wherein
    the setting of the one or more pixels is configured to, in a case where a plurality of the determination pixels is set, set pixels at positions of which distances from the center of the detected circle are different from each other as the determination pixels.

3. The circular sign candidate extraction device according to claim 1, wherein
    the setting of the one or more pixels is configured to, in a case where the plurality of determination pixels is set, perform setting so that a scattering degree of positions of the determination pixels in the annular region is equal to or more than a predetermined value.

4. The circular sign candidate extraction device according to claim 3, wherein
    the setting of the one or more pixels is configured to set each of pixels on lines in four directions orthogonal to each other at the center of the detected circle as the determination pixel.

5. The circular sign candidate extraction device according to claim 1, wherein
    the specifying of the annular region is configured to specify a first annular region surrounded by the detected circle and the concentric circle that has a radius smaller than the detected circle and a second annular region surrounded by the detected circle and the concentric circle that has a radius larger than the detected circle,
    the setting of the one or more pixels is configured to set the determination pixels to each of the first annular region and the second annular region, and
    the extracting of the circular sign is configured to extract a circular sign candidate from the detected circle on the basis of comparison between a color of the determination pixel set to the first annular region and a predetermined first color and comparison between a color of the determination pixel set to the second annular region and a predetermined second color.

6. The circular sign candidate extraction device according to claim 1, the processing further comprising:
    transmitting a partial image that indicates the extracted circular sign candidate to an external device configured to recognize a circular sign indicated by the partial image; and
    receiving a recognition result from the external device.

7. A computer-readable recording medium having stored therein a circular sign candidate extraction program for causing a computer to execute processing comprising:
    detecting a circle from a captured image;
    specifying an annular region surrounded by the detected circle and a concentric circle, the concentric circle being a circle having a radius different from the detected circle;

setting one or more pixels among pixels included in the annular region as determination pixels; and extracting a circular sign candidate from the detected circle in accordance with comparison between a color of the determination pixel and a predetermined color.

8. The computer-readable recording medium according to claim 7, wherein the setting of the one or more pixels is configured to, in a case where a plurality of the determination pixels is set, set pixels at positions of which distances from the center of the detected circle are different from each other as the determination pixels.

9. The computer-readable recording medium according to claim 7, wherein the setting of the one or more pixels is configured to, in a case where the plurality of determination pixels is set, perform setting so that a scattering degree of positions of the determination pixels in the annular region is equal to or more than a predetermined value.

10. The computer-readable recording medium according to claim 9, wherein the setting of the one or more pixels is configured to set each of pixels on lines in four directions orthogonal to each other at the center of the detected circle as the determination pixel.

11. The computer-readable recording medium according to claim 7, wherein the specifying of the annular region is configured to specify a first annular region surrounded by the detected circle and the concentric circle that has a radius smaller than the detected circle and a second annular region surrounded by the detected circle and the concentric circle that has a radius larger than the detected circle, the setting of the one or more pixels is configured to set the determination pixels to each of the first annular region and the second annular region, and the extracting of the circular sign is configured to extract a circular sign candidate from the detected circle on the basis of comparison between a color of the determination pixel set to the first annular region and a predetermined first color and comparison between a color of the determination pixel set to the second annular region and a predetermined second color.

12. The computer-readable recording medium according to claim 7, the processing further comprising:

transmitting a partial image that indicates the extracted circular sign candidate to an external device configured to recognize a circular sign indicated by the partial image; and receiving a recognition result from the external device.

13. A computer-based method of a circular sign candidate extraction, the method comprising:

detecting a circle from a captured image;

specifying an annular region surrounded by the detected circle and a concentric circle, the concentric circle being a circle having a radius different from the detected circle;

setting one or more pixels among pixels included in the annular region as determination pixels; and extracting a circular sign candidate from the detected circle in accordance with comparison between a color of the determination pixel and a predetermined color.

14. The method according to claim 13, wherein the setting of the one or more pixels is configured to, in a case where a plurality of the determination pixels is set, set pixels at positions of which distances from the center of the detected circle are different from each other as the determination pixels.

15. The method according to claim 13, wherein the setting of the one or more pixels is configured to, in a case where the plurality of determination pixels is set, perform setting so that a scattering degree of positions of the determination pixels in the annular region is equal to or more than a predetermined value.

16. The method according to claim 15, wherein the setting of the one or more pixels is configured to set each of pixels on lines in four directions orthogonal to each other at the center of the detected circle as the determination pixel.

17. The method according to claim 13, wherein the specifying of the annular region is configured to specify a first annular region surrounded by the detected circle and the concentric circle that has a radius smaller than the detected circle and a second annular region surrounded by the detected circle and the concentric circle that has a radius larger than the detected circle, the setting of the one or more pixels is configured to set the determination pixels to each of the first annular region and the second annular region, and the extracting of the circular sign is configured to extract a circular sign candidate from the detected circle on the basis of comparison between a color of the determination pixel set to the first annular region and a predetermined first color and comparison between a color of the determination pixel set to the second annular region and a predetermined second color.

18. The method according to claim 13, the method further comprising:

transmitting a partial image that indicates the extracted circular sign candidate to an external device configured to recognize a circular sign indicated by the partial image; and receiving a recognition result from the external device.

* * * * *